US008055535B2

(12) United States Patent
Lavoie et al.

(10) Patent No.: US 8,055,535 B2
(45) Date of Patent: Nov. 8, 2011

(54) METHOD AND APPARATUS FOR TRACKING CUSTOMER PURCHASES USING A UNIQUE ANONYMOUS IDENTIFIER

(75) Inventors: James R. Lavoie, Voluntown, CT (US); Robert C. Angell, West Greenwich, RI (US); John Amedeo Santini, Jr., Wakefield, RI (US)

(73) Assignee: Rite-Solutions, Inc., Pawcatuck, CT (US)

( * ) Notice: Subject to any disclaimer, the term of this patent is extended or adjusted under 35 U.S.C. 154(b) by 1331 days.

(21) Appl. No.: 10/557,245

(22) PCT Filed: May 13, 2004
(Under 37 CFR 1.47)

(86) PCT No.: PCT/US2004/014902
§ 371 (c)(1),
(2), (4) Date: Oct. 30, 2006

(87) PCT Pub. No.: WO2004/104738
PCT Pub. Date: Dec. 2, 2004

(65) Prior Publication Data
US 2007/0255615 A1    Nov. 1, 2007

Related U.S. Application Data

(60) Provisional application No. 60/471,150, filed on May 16, 2003.

(51) Int. Cl.
*G06Q 30/00* (2006.01)
(52) U.S. Cl. ...................................................... 705/14.1
(58) Field of Classification Search ................. 705/14.1
See application file for complete search history.

(56) References Cited

U.S. PATENT DOCUMENTS

| 6,748,365 B1 | 6/2004 | Quinlan et al. ................. 705/14 |
| 7,013,290 B2 * | 3/2006 | Ananian ..................... 705/26.42 |
| 7,203,315 B1 * | 4/2007 | Livesay ....................... 380/255 |

\* cited by examiner

*Primary Examiner* — Daniel Lastra
(74) *Attorney, Agent, or Firm* — Ryan, Mason & Lewis, LLP

(57) ABSTRACT

A method and apparatus are provided for tracking customer purchases using a unique anonymous identifier. Customer purchases are monitored by obtaining a unique anonymous identifier from the customer as part of a current transaction; and associating the current transaction with a prior transaction using the unique anonymous identifier. The unique anonymous identifier can be, for example, a purchase identifier associated with the prior transaction, and provides a link among a plurality of transactions associated with the customer. The current or prior transaction (or both) can optionally be clustered with one or more transactions associated with registered users having known demographics to obtain demographic information for at least one of the current and prior transactions.

24 Claims, 5 Drawing Sheets

METHOD AND APPARATUS FOR TRACKING CUSTOMER PURCHASES USING A UNIQUE ANONYMOUS IDENTIFIER

CROSS REFERENCE TO RELATED APPLICATIONS

This application claims the benefit of U.S. Provisional Application No. 60/471,150, filed May 16, 2003.

FIELD OF THE INVENTION

The present invention relates generally to loyalty reward programs, and more particularly, to methods and apparatus for tracking customer behavior using a unique anonymous identifier.

BACKGROUND OF THE INVENTION

In order to attract new customers and to strengthen customer loyalty among existing customers, many businesses offer loyalty reward programs. Loyalty reward programs are commonplace in a wide variety of industries, including travel and grocery stores. Each member in a loyalty reward program is generally issued a membership card having an identification number, after a registration process that collects certain personal information, such as a name, address and additional demographic information. The business thereafter credits the customer with loyalty points (or airline miles) for each purchase. Typically, accumulated loyalty points can be redeemed for goods, services or discounts on future purchases. The loyalty reward programs provide a mechanism for companies to monitor the purchase history of each enrolled customer, and to thereby ascertain behavioral trends. In addition, the business can review the recorded activity and award a corresponding level of reward to each customer.

While such loyalty reward programs often successfully develop customer loyalty, it has been found that many customers are uncomfortable providing personal information and are distrustful of the motives of the business for gathering data regarding their activities. The level of discomfort may vary with the nature of the products or services offered by the business. For example, a customer may be particularly unwilling to reveal their personal information in connection with purchases of lottery tickets or liquor. For this reason, participation in these programs, while significant, is limited to a particular demographic that is willing to have their purchase history monitored. Meanwhile, traditional methods of collecting consumer information without direct consumer cooperation may provide useful information but only with coarse resolution and no ability to directly and visibly benefit consumers.

A need therefore exists for a method and apparatus for the anonymous tracking of consumer purchases. A further need exists for a method and apparatus for tracking consumer purchases using a unique anonymous identifier. Yet another need exists for a method and apparatus that permits the anonymous tracking of consumer purchases while directly rewarding consumers for such purchases.

SUMMARY OF THE INVENTION

Generally, a method and apparatus are provided for tracking customer purchases using a unique anonymous identifier. Customer purchases are monitored by obtaining a unique anonymous identifier from the customer as part of a current transaction; and associating the current transaction with a prior transaction using the unique anonymous identifier. The unique anonymous identifier can be, for example, a purchase identifier associated with the prior transaction and provides a link among a plurality of transactions associated with the customer. The purchase identifier can be obtained, for example, from a receipt associated with the prior transaction. The current or prior transaction (or both) can optionally be clustered with one or more transactions associated with registered users having known demographics to obtain demographic information for at least one of the current and prior transactions.

In one embodiment, a receipt is obtained from a customer as part of a current transaction, where the receipt is associated with a prior transaction of the customer; and the current transaction is then associated with the prior transaction using a purchase identifier on the receipt.

A more complete understanding of the present invention, as well as further features and advantages of the present invention, will be obtained by reference to the following detailed description and drawings.

DETAILED DESCRIPTION

Figure 1:
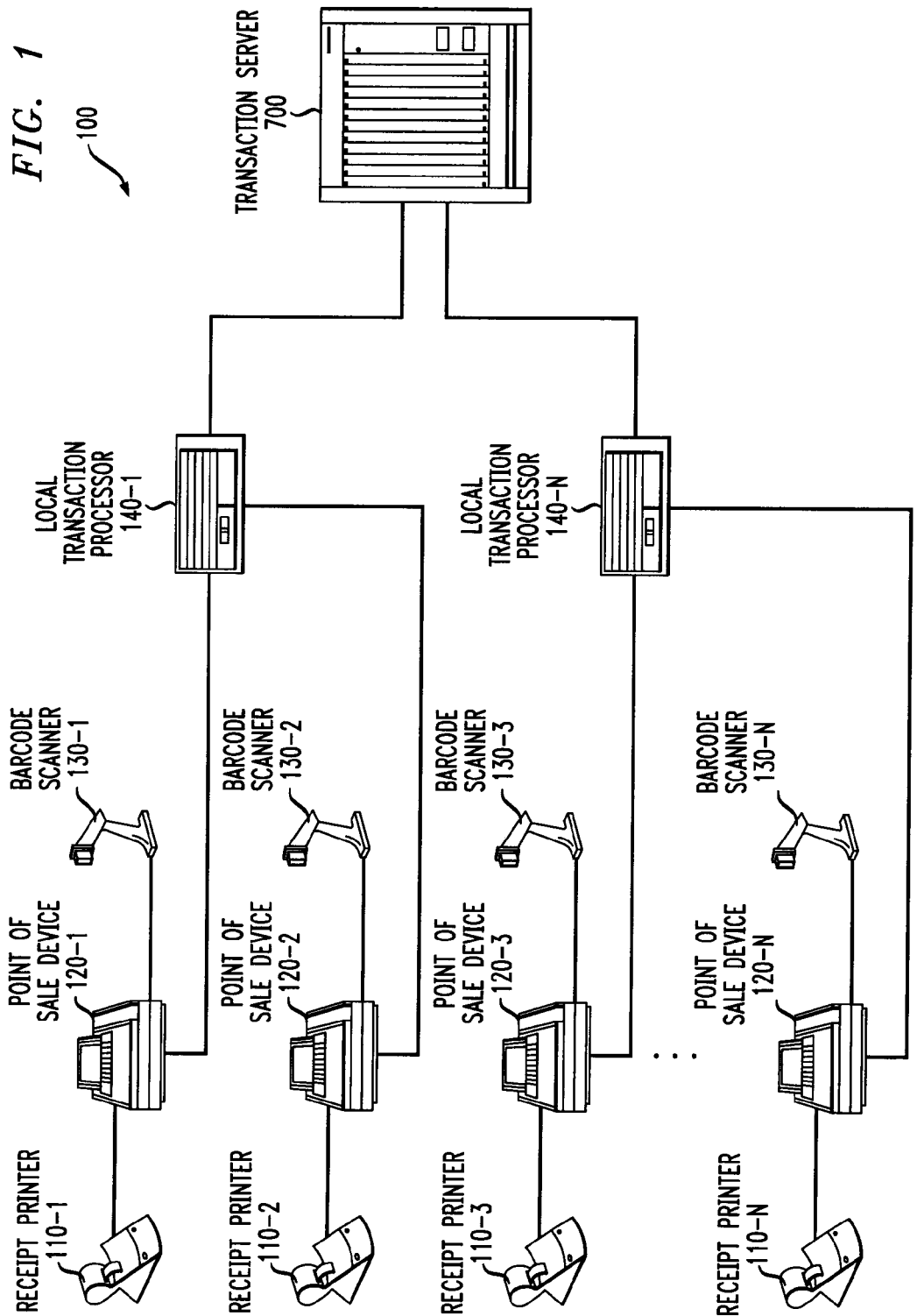
FIG. 1 illustrates a network environment in which the present invention can operate.

FIG. 1 illustrates a network environment 100 in which the present invention can operate. The network environment 100 may be, for example, a network provided by a retailer, retail associated, or credit card processing company to link computing devices in a distributed retail environment. The network environment 100 may be embodied as a public or private network (or both) permitting wired or wireless connections (or both) between computing devices. As shown in FIG. 1, the exemplary network environment 100 includes one or more point of sale devices 120-1 through 120-N, each having an associated receipt printer 110-1 through 110-N and bar code scanner 130-1 through 130-N. One or more of the point of sale devices 120 can be connected to a corresponding local transaction processor 140-1 through 140-N. For example, a local transaction processor 140 may be provided for each individual retail store. Each of the local transaction processors 140 are connected to a centralized transaction server 700, discussed further below in conjunction with FIG. 7.

According to one aspect of the present invention, a business can anonymously monitor the purchases of customers while directly rewarding consumers for such purchases. The anonymous rating and tracking of consumers eliminates most consumer objections to conventional tracking and rating systems. The present invention does not require a customer to enroll or to establish an account, nor to produce proof of membership when making a purchase. In addition, the customer does not have to be identified to the business. Nonetheless, the actions of the customer can be tracked by the business as an individual, and rewards can be earned and presented directly to that individual. In this manner, the business can acquire high-resolution information, while allowing the customer to remain anonymous. Furthermore, the business can reward desirable behavior, which provides a direct benefit to the customer.

Anonymous rating and tracking is accomplished in accordance with the present invention by recording behavior (business transactions) against an account. All actions carried out against a given account are attributed to an individual. Unlike conventional solutions, however, the anonymous solution of the present invention creates accounts dynamically when a business transaction is conducted. Customers simply present a receipt from a prior transaction or some other consistent token when conducting the current transaction and the new activity is associated with the prior account. In this manner, a link is created among the various transactions associated with a given, anonymous consumer. New accounts are created when prior accounts are not referenced.

According to a further aspect of the invention, accumulated rewards can be presented to the consumer when business is conducted. For example, reward status can be made available to the consumer by presenting the token of a prior transaction to an information kiosk, or via a computer network (such as the Internet), or to service personnel designated to assist consumers. The presentation of the token of a prior transaction is sufficient to link the current activity to that from the past and hence the behavior of the individual can be tracked. Since the individual can present such a token at any time, the rewards associated with the consumer's history can be granted at any time, with nothing more required than any past proof of a business transaction.

The anonymous rating and tracking of the present invention does not provide the business with demographic information for a particular individual. Such information would be useful, for example, to contact the individual (for direct promotions and the like) and also to make generalizations about consumer performance based on demographic factors such as age, sex, and home geographic area. Nonetheless, since the anonymous data is being gathered for individuals who prefer to remain anonymous, no demographic data would have been otherwise available, and in fact, no performance data would be available as well. Furthermore, each time a customer visits a participating business, a new opportunity exists to provide promotions and rewards to the customer, without disturbing the customer's sense of privacy.

In addition, the consumer may lose some of the intimacy of the experience with the business, such as the business being unable to greet the customer by name, or rewards may not be delivered to the customer's home. If a customer desires a level of intimacy that cannot be provided in an anonymous relationship, then the customer is free to enroll in a personalized loyalty program. The anonymous method of the present invention is envisioned as a supplement to, rather than a replacement for, conventional tracking and rating systems.

Furthermore, if the anonymous method of the present invention is joined with a traditional tracking and rating system, the lack of demographic information for customers in the anonymous system can be overcome by identifying correlations between customers in the anonymous tracking system and the personalized tracking system. For example, statistical methods exist that facilitate the clustering of performance information for the purpose of identification or projection of future activity by nodes in a system (accounts that are being tracked). Recent advances in computing technology make this method tractable as computers can easily manage the very large data sets involved, and computational methods have evolved to make effective use of them and allow the effective and accurate correlation of such data and to draw meaningful conclusions from them.

Figure 2:
FIG. 2 is an exemplary receipt having a purchase identifier that can be used as a unique anonymous identifier to provide anonymous tracking of consumer purchases in accordance with the present invention.

FIG. 2 illustrates an exemplary receipt 200 having a purchase identifier 220 that can be used as a unique anonymous identifier to provide anonymous tracking of consumer purchases in accordance with the present invention. As shown in FIG. 2, the exemplary receipt 200 includes an area 210 for itemizing the various items purchased by the customer. The purchase identifier 220 provides a unique number that identifies the transaction and may be utilized as a key into a transaction database 300, 400, as discussed further below in conjunction with FIGS. 3 and 4, that stores information on each transaction. In addition, the purchase identifier 220 provides a unique number that is used in accordance with the present invention to provide a mechanism for linking all of the transactions associated with a given customer. The date of the transaction is indicated on the receipt 200 in a date field 240 and the total amount of the purchase is indicated in an amount field 250. The manner in which the various parameters of the transaction are recorded in a corresponding record 400 in a transaction database is discussed below in conjunction with FIG. 4.

Figure 3:
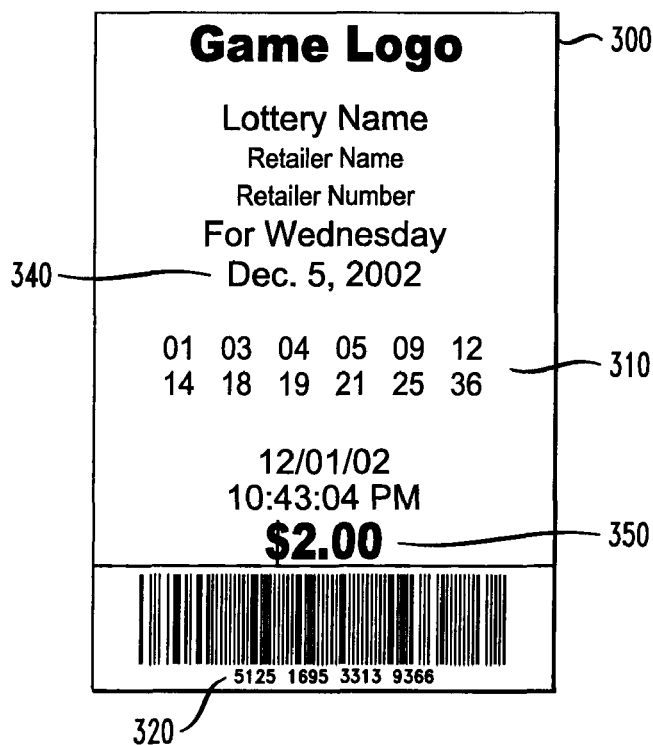
FIG. 3 is an exemplary lottery receipt having a purchase identifier that can be used as a unique anonymous identifier to provide anonymous tracking of consumer purchases in accordance with the present invention.

FIG. 3 is an exemplary lottery receipt 300 having a purchase identifier 320 that can be used as a unique anonymous identifier to provide anonymous tracking of consumer purchases in accordance with the present invention. As shown in FIG. 3, the exemplary lottery receipt 300 includes an area 310 for itemizing the various numbers selected by (or for) the customer for a given lottery game. The purchase identifier 320 provides a unique number that identifies the transaction and may be utilized as a key into a transaction database 300, 400, as discussed further below in conjunction with FIGS. 3 and 4, that stores information on each transaction. In addition, the purchase identifier 320 provides a unique number that is used in accordance with the present invention to provide a mechanism for linking all of the transactions associated with a given customer. The draw date of the lottery game is indicated on the lottery receipt 300 in a draw date field 340 and the total amount of the wager is indicated in an amount field 350. The manner in which the various parameters of the transaction are recorded in a corresponding record 500 in a transaction database is discussed below in conjunction with FIG. 5.

Figures 4, 5:
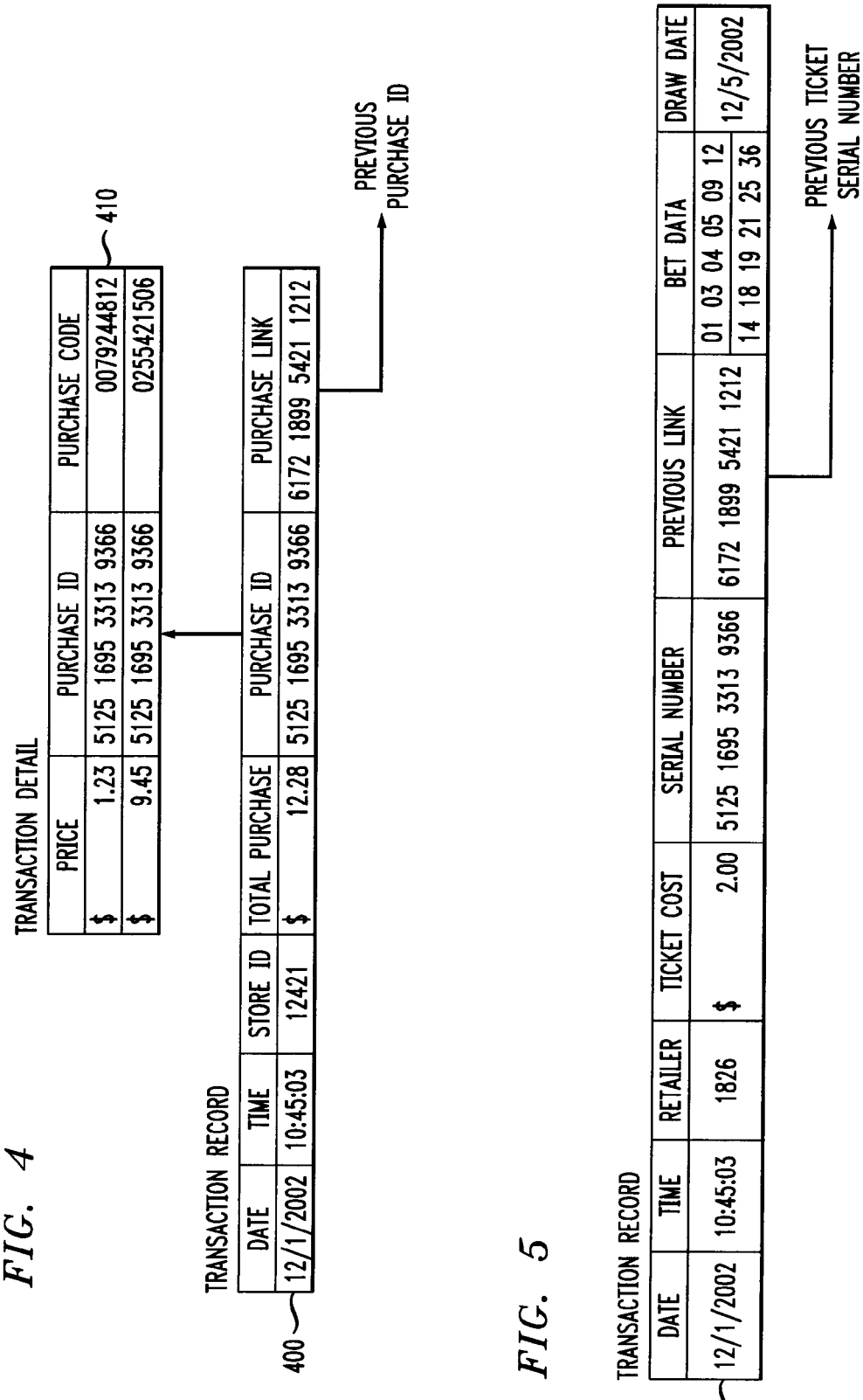
FIG. 4 is a sample record associated with the receipt of FIG. 2 from a transaction database.
FIG. 5 is a sample record associated with the lottery receipt of FIG. 3 from a transaction database.

FIG. 4 is a sample record 400 associated with the receipt 200 of FIG. 2 from a transaction database. The transaction database typically includes a record associated with each transaction. As shown in FIG. 4, the exemplary transaction record 400 includes a plurality of fields for recording the date, time, store, purchase amount, purchase identifier and purchase link (to a previous transaction) of a given transaction. Generally, the fields of the exemplary transaction record 400 are populated with information from the corresponding receipt 200 of FIG. 2. In accordance with the present invention, the purchase identifier uniquely identifies the current transaction and can be presented in connection with a future transaction to link the purchases of the current customer. In this sense, the present invention provides added value to a piece of paper (i.e., the receipt 200) that ordinarily would have little or no value. In addition, the current exemplary transaction is linked to a previous transaction associated with the same customer through the purchase link to a previous transaction. In other words, when the customer made the present purchase of motor oil and flowers, as indicated in the transaction detail 310, the customer presented a receipt from a prior purchase having the purchase identifier that is recorded in the purchase link field. It is noted that upon a future purchase, the same customer can present any previously linked receipt in order to link the future purchase to the previously linked purchases, as would be apparent to a person of ordinary skill in the art.

FIG. 5 is a sample record 500 associated with the lottery receipt 300 of FIG. 3 from a transaction database. As shown in FIG. 5, the exemplary transaction record 500 includes a plurality of fields for recording the date, time, store (retailer), purchase amount (ticket cost), purchase identifier (serial number) and purchase link (to a previous transaction) of a given transaction. In addition, the lottery receipt 300 typically identifies the various numbers selected by (or for) the customer for a given lottery game, as well as the corresponding draw date. The lottery receipt 300 provides evidence of a game play and is typically required to redeem a winning ticket. Once the game is played, however, losing tickets typically have no value. Thus, as previously indicated, the present invention provides added value to a piece of paper (i.e., the losing lottery receipt 300) that ordinarily would have little or no value. Generally, the fields of the exemplary transaction record 500 are populated with information from the corresponding lottery receipt 300 of FIG. 3. In accordance with the present invention, the purchase identifier (serial number) uniquely identifies the current transaction and can be presented in connection with a future transaction to link the purchases of the customer. It is noted that in connection with the purchase of the lottery ticket 300, the customer presented the same previous receipt associated with a previous purchase as was presented with the receipt 200 in order to link the transactions. Thus, both records 400, 500 have the same purchase/previous link to a prior transaction.

According to a further aspect of the present invention, the receipts 200, 300 presented to a customer in connection with a transaction can be identical to a conventional receipt. Thus, modifications are not required to the point of sale device 120 or the receipt printer 110. The only modification to a conventional transaction processing system is the ability to obtain a receipt associated with a prior purchase, and to extract a purchase identifier from the prior receipt, for example, using the bar code scanner 130, for recording in a corresponding record 300, 400, of the transaction database. Likewise, the transaction database may be embodied as a conventional transaction database, as modified herein to include an additional field for recording the purchase identifier from the prior receipt as a purchase link for the present transaction.

Figure 6:
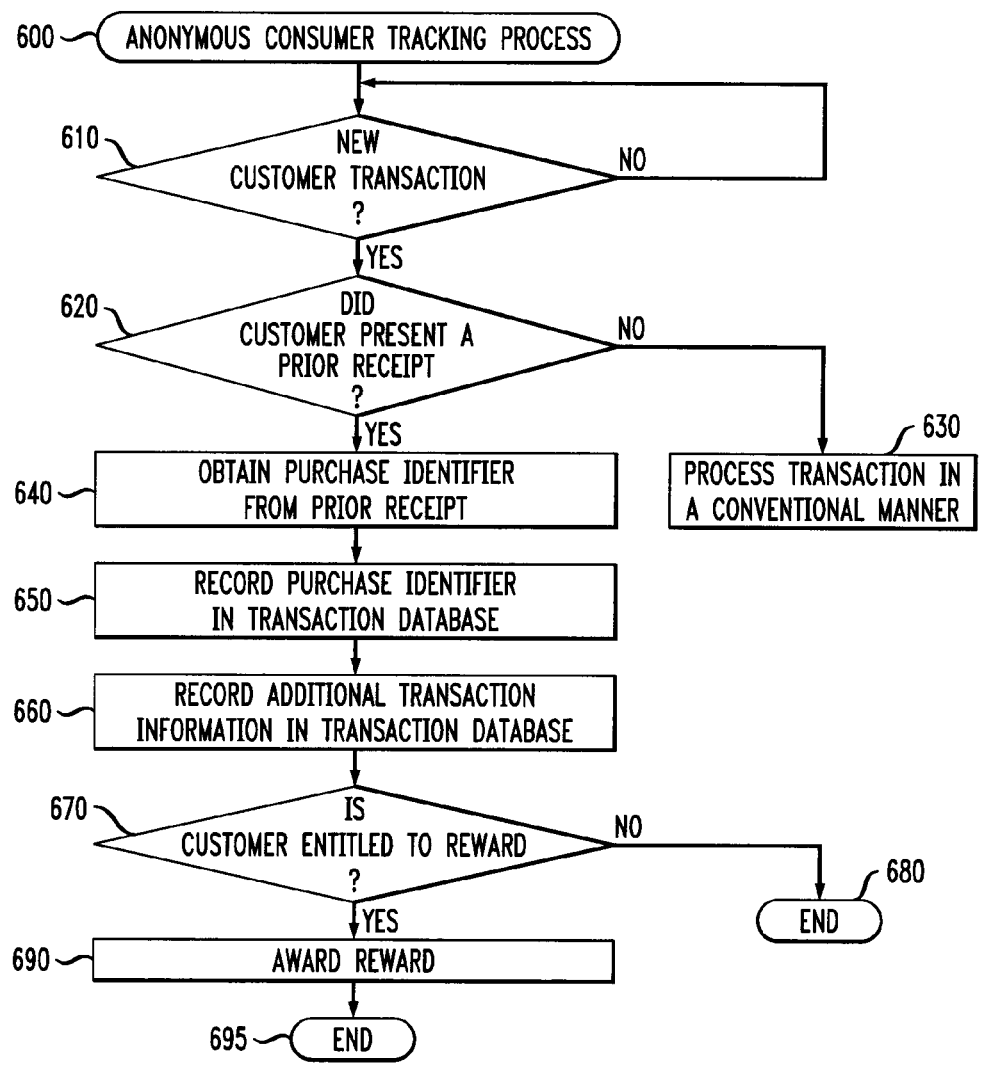
FIG. 6 is a flow chart describing an exemplary implementation of an anonymous consumer tracking process as employed by the transaction server of FIG. 1.
Figure 7:
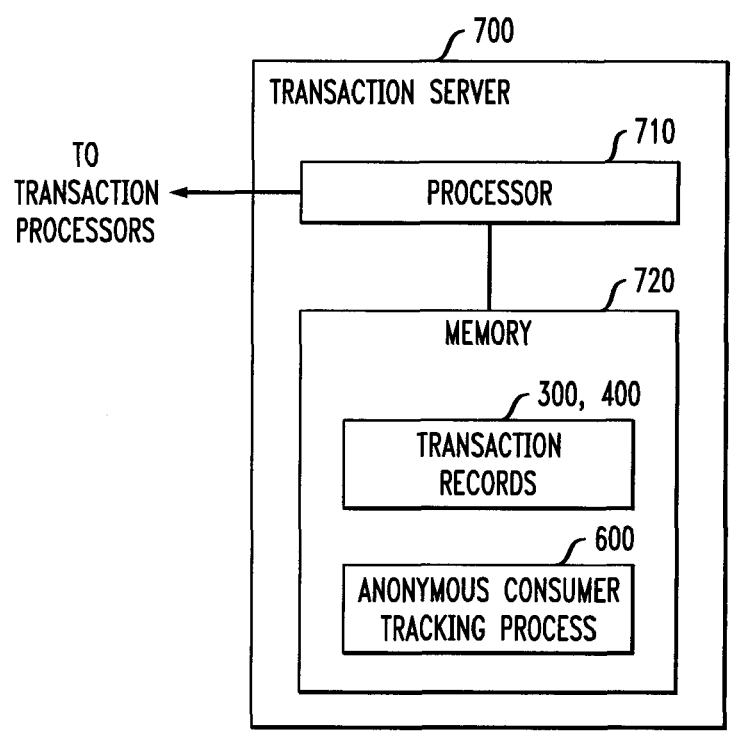
FIG. 7 is a schematic block diagram of one embodiment of the transaction server of FIG. 1 in further detail incorporating features of the present invention.

FIG. 6 is a flow chart describing an exemplary implementation of an anonymous consumer tracking process 600 as employed by the transaction server 700 of FIGS. 1 and 7. As shown in FIG. 6, the exemplary anonymous consumer tracking process 600 is initiated during step 610 when a new customer transaction is detected. A test is performed during step 620 to determine if the customer presented a prior receipt in connection with the new customer transaction. If it is determined during step 620 that the customer did not present a prior receipt in connection with the new customer transaction, then to process is handled in a conventional manner during step 630.

It however, it is determined during step 620 that the customer presented a prior receipt in connection with the new customer transaction, then the purchase identifier is obtained from the prior receipt during step 640 and recorded in the purchase link field of a record created in the transaction database for the current transaction during step 650. Additional transaction information, such as date, time and amount of the transaction is also stored in the transaction database record during step 660. In this manner, the current transaction is anonymously linked to one or more prior transactions associated with the same customer in accordance with the present invention.

A further optional test is performed during step 670 to determine if the customer is entitled to any rewards based on his or her current purchase history. If it is determined during step 670 that the customer is not currently entitled to any rewards, then program control terminates during step 680. If, however, it is determined during step 670 that the customer is entitled to one or more rewards, then the rewards are awarded to the customer at the point of sale during step 690, before program control terminates during step 695.

FIG. 7 is a schematic block diagram of one embodiment of the transaction server 700 of FIG. 1 in further detail incorporating features of the present invention. The transaction server 700 may be embodied as any computing device having a processor 710 and memory 720, such as a personal computer or work station, as would be apparent to a person of ordinary skill in the art. As shown in FIG. 7, the memory 720 of the transaction server 700 includes the transaction records 300, 400, discussed above in conjunction with FIGS. 3 and 4, from a transaction database and the anonymous consumer tracking process 600, discussed above in conjunction with FIG. 6.

In another variation of the invention, elapsed time can be used as a mechanism for associating a validation with a repurchase and therefore the initial transaction is linked to the repurchase transaction through the element of "closeness" in time. For example, if a person buys an e-scratch ticket on Monday, and it has a final outcome value of $14.00 that is played on Wednesday, and the person brings the ticket back to the retailer on Friday, the retailer can validate the ticket and repurchase more outcomes with the $14.00. In this manner, the Monday transaction and the Friday transaction are linked.

As is known in the art, the methods and apparatus discussed herein may be distributed as an article of manufacture that itself comprises a computer readable medium having computer readable code means embodied thereon. The computer readable program code means is operable, in conjunction with a computer system, to carry cut all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for monitoring a customer, said method comprising the steps of:
   receiving a unique anonymous identifier from said customer as part of a current transaction; and
   linking said current transaction with a prior transaction using said unique anonymous identifier, wherein said unique anonymous identifier is obtained from a token provided with said prior transaction and uniquely identifies said prior transaction, wherein one or more of said steps are performed by a processor.

2. The method of claim 1, wherein said unique anonymous identifier is a purchase identifier associated with said prior transaction.

3. The method of claim 2, wherein said token is a receipt associated with said prior transaction.

4. The method of claim 1, wherein said unique anonymous identifier provides a link among a plurality of transactions associated with said customer.

5. The method of claim 1, further comprising the step of recording said unique anonymous identifier in a transaction record associated with said current transaction.

6. The method of claim 1, further comprising the step of clustering at least one of said current and prior transactions with one or more transactions associated with registered users having known demographics to obtain demographic information for at least one of said current and prior transactions.

7. The method of claim 1, wherein said unique anonymous identifier is issued in connection with said prior transaction.

8. The method of claim 1, wherein said unique anonymous identifier is based on a closeness in time of said current and prior transactions.

9. The method of claim 1, further comprising the step of determining if said customer is eligible for a reward.

10. A method for monitoring a customer, said method comprising the steps of:
    receiving a receipt from said customer as part of a current transaction, said receipt being associated with a prior transaction of said customer; and
    linking said current transaction with said prior transaction using a purchase identifier on said receipt, wherein said purchase identifier uniquely identifies said prior transaction, wherein one or more of said steps are performed by a processor.

11. The method of claim 10, wherein said purchase identifier provides a link among a plurality of transactions associated with said customer.

12. The method of claim 10, further comprising the step of recording said purchase identifier in a transaction record associated with said current transaction.

13. The method of claim 10, further comprising the step of clustering at least one of said current and prior transactions with one or more transactions associated with registered users having known demographics to obtain demographic information for at least one of said current and prior transactions.

14. The method of claim 10, further comprising the step of determining if said customer is eligible for a reward.

15. The method of claim 10, wherein said unique anonymous identifier is issued in connection with said prior transaction.

16. A system for monitoring a customer, said system comprising:
    a memory; and
    at least one processor, coupled to the memory, operative to:
    receive a unique anonymous identifier from said customer as part of a current transaction; and
    link said current transaction with a prior transaction using said unique anonymous identifier, wherein said unique anonymous identifier is obtained from a token provided with said prior transaction and uniquely identifies said prior transaction.

17. The system of claim 16, wherein said unique anonymous identifier is a purchase identifier associated with said prior transaction.

18. The system of claim 17, wherein said token is a receipt associated with said prior transaction.

19. The system of claim 16, wherein said unique anonymous identifier provides a link among a plurality of transactions associated with said customer.

20. The system of claim 16, wherein said processor is further configured to record said unique anonymous identifier in a transaction record associated with said current transaction.

21. The system of claim 16, wherein said processor is further configured to cluster at least one of said current and prior transactions with one or more transactions associated with registered users having known demographics to obtain demographic information for at least one of said current and prior transactions.

22. The system of claim 16, wherein said unique anonymous identifier is issued in connection with said prior transaction.

23. The system of claim 16, wherein said processor is further configured to determine if said customer is eligible for a reward.

24. An article of manufacture for monitoring a customer, comprising a machine readable recordable medium containing one or more programs which when executed implement the steps of:
    receiving a unique anonymous identifier from said customer as part of a current transaction; and
    linking said current transaction with a prior transaction using said unique anonymous identifier, wherein said unique anonymous identifier is obtained from a token provided with said prior transaction and uniquely identifies said prior transaction.

* * * * *